United States Patent [19]

Sherman et al.

[11] Patent Number: 4,461,533

[45] Date of Patent: Jul. 24, 1984

[54] FORMING AND READING HOLOGRAMS

[75] Inventors: Rand C. Sherman; Richard P. Kenan, both of Upper Arlington, Ohio

[73] Assignee: Battelle Memorial Institute, Columbus, Ohio

[21] Appl. No.: 418,892

[22] Filed: Sep. 16, 1982

[51] Int. Cl.³ .............................................. G03H 1/02
[52] U.S. Cl. .................................... 350/372; 350/320
[58] Field of Search ...................... 350/3.69, 3.6, 3.83, 350/3.85, 3.86, 3.7, 3.72

[56] References Cited

U.S. PATENT DOCUMENTS

| | | | |
|---|---|---|---|
| 3,598,466 | 8/1971 | Friedl | 350/3.61 |
| 3,639,031 | 2/1972 | Lin | 350/3.61 X |
| 3,814,498 | 6/1974 | Tomlinson et al. | 350/96.19 |
| 4,152,045 | 5/1979 | Hammer | 350/96.19 |

OTHER PUBLICATIONS

Latta, J. N., "Computer-Based Analysis of Hologram Imagery and Aberrations II: Aberrations Introduced by Wavelength Shift," Applied Optics, vol. 10, No. 3, pp. 609-618.

Primary Examiner—Bruce Y. Arnold
Attorney, Agent, or Firm—Philip J. Pollick; Philip M. Dunson

[57] ABSTRACT

A method of forming and reading a hologram, useful for instance as a lens, is disclosed which eliminates chromatic aberrations usually present when a hologram is recorded using light of a higher frequency than that for which the hologram is to be used on reconstruction. The fringes created by the interference of two beams of radiation at the recording frequency in a first medium are transferred to a recording second medium by virtue of the second medium having a surface contiguous to the fringes in the first medium. The second medium is then developed to produce a hologram. A reconstruction beam from a laser having a lower frequency than that of the recording beams is directed at a third medium which is contiguous to a surface of the hologram so as to cause the wavelength of the read-out beam to equal that of the recording beams.

17 Claims, 5 Drawing Figures

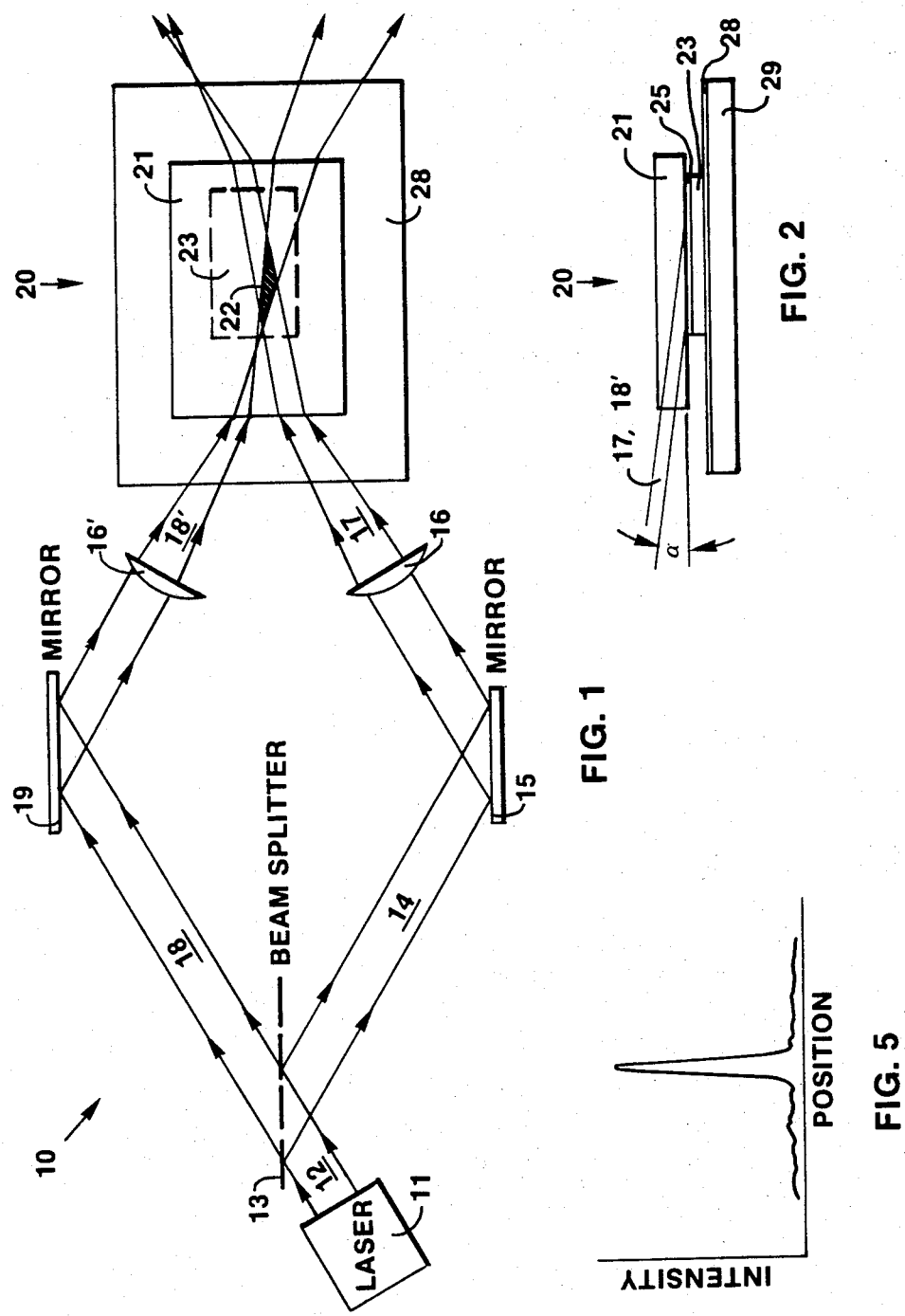

FORMING AND READING HOLOGRAMS

FIELD

This invention relates to a method for recording and reading holograms. It is directed especially toward the elimination of chromatic aberrations in holograms recorded using coherent radiation of one free-space wavelength and reconstructed using coherent radiation of another free-space wavelength.

BACKGROUND

The classical holographic optical element is a lens formed by recording the interference pattern from a plane wave and a converging spherical wave in a suitable medium like photographic film. When the hologram is read out using a plane wave, the light is focused at the same point as the original spherical wave, provided that the wavelength of the reconstructing light is the same as that of the light used to record the hologram and provided that the other relevant properties (mean refractive index of the film, for example) are unchanged. Unfortunately, most holographic lenses are meant to be used at free-space wavelengths that are somewhat longer (lower frequencies) than the free-space wavelengths (higher frequencies) at which good and available optical recording materials are most sensitive, so holograms must be recorded by light of different free-space wavelength (higher frequency) from that at which they are to be used (lower frequency). Since the angles at which light rays are diffracted from the local grating structure comprising the hologram are nonlinear functions of the fringe spacings and the optical wavelengths of the reconstructing light, the wavelength shift between recording and reconstructing a hologram introduces aberrations. This is further compounded by the fact that if high diffraction efficiencies are also required, thick (Bragg) phase holograms must be used; so, geometric constraints become more severe, since these holograms require that the light enter at prescribed angles.

Because holographic optical elements have important industrial and military applications such as in missile guidance, robotics, and automation, considerable effort has been directed to overcoming the aberrations attendant with wavelength shifts. A recent publication by K. Winick ("Designing Efficient Aberration-Free Holographic Lenses in the Presence of a Construction-Reconstruction Wavelength Shift," J. Opt. Soc. Am. 72, 143–148, 1982) details the design of diffraction-limited lenses that also operate correctly in the Bragg regime, to first order. Earlier publications by J. M. Moran ("Compensation of Aberrations Due to a Wavelength Shift in Holography," Applied Optics 10, 1909–1913, 1971) and by J. N. Latta ("Computer-Based Analysis of Hologram Imagery and Aberrations II: Aberrations Induced by a Wavelength Shift," Applied Optics 10, 609–618, 1971) laid the foundations for computer analysis to minimize aberrations in such elements. The results of the analyses are used to design geometries that will permit using competing aberrations to cancel one another.

For image reproducing systems, W. Friedl (U.S. Pat. No. 3,598,466 Aug. 10, 1971) uses a system of lenses to correct aberrations in a hologram produced with visible radiation and reconstructed with infrared radiation while L. Lin (U.S. Pat. No. 3,639,031, Feb. 1, 1972) records a first hologram at a first free space wavelength and then produces a second hologram from the first hologram using light of a second free space wavelength. The second hologram is read using light of the first free-space wavelength to produce an image with minimum aberration.

Although holographically-formed gratings have been used to achieve optical coupling between fiber-optic waveguides and planaroptic waveguides (J. Hammer, U.S. Pat. Nos. 3,912,363 Oct. 14, 1975 and 4,152,045, May 1, 1979 and S. Wright, U.S. Pat. No. 4,184,738, Jan. 22, 1980) and for wavelength multiplexing/demultiplexing (W. Tomlinson, et. al., U.S. Pat. No. 3,814,498, June 4, 1974), this prior art does not mention the reduction or elimination of chromatic aberration in holograms.

SUMMARY

A typical process according to the present invention comprises the steps of forming an interference pattern with beams of coherent electromagnetic radiation at a first free space wavelength in a first medium of a first refractive index, forming a hologram with the said light beams now having a second wavelength by recording the interference pattern on a recording second medium that is in contact with the first medium such that the inteference pattern is continuous across the boundary between the first medium and the recording second medium and reading the hologram by passing a reconstructing beam of electromagnetic radiation of a second free space wavelength into a third medium of which at least one surface is in contact with the second medium so as to produce a wavelength of the reconstructing beam that is the same as the radiation wavelength used to form the interference pattern in the first medium.

Typically the third medium is a waveguide that is in contact with the hologram and has an index of refraction that is less than that of the material comprising the hologram. The wavelength of the reconstructing beam in the hologram is determined by the number of guided modes that can be supported in the waveguide and the hologram material (second medium) or in the hologram material itself. For hologram material too thin to support at least one guided mode, the index of refraction is essentially that of the waveguide material. As the hologram material becomes thicker and capable of supporting one or more guided modes, the effective index of refraction for the guided light depends on the hologram material and, as an upper limit, approaches the bulk refractive index for the hologram material.

Typically the recording beams of electromagnetic radiation are directed into the first medium at a slight angle to the plane of the recording medium to insure that the interference pattern exists at the boundary between the first and recording second media. Also an index-matching fluid with a refractive index higher than that of the first medium but lower than that of the recording medium may be used to insure intimate optical contact between the first medium and the recording second medium. Typically such an index-matching fluid improves contact between the two media by filling voids caused by surface irregularities in the contacting media.

Since most of the good and available optical recording materials are more sensitive to higher-frequency (shorter free-space wavelength) light than to the lower-frequency (longer free-space wavelength) light with which most holograms are used, the hologram is typically recorded at shorter free-space wavelengths and read at longer free-space wavelengths.

DRAWINGS

FIG. 1 is a schematic top view of a typical configuration according to the present invention for forming a holographic lens.

FIG. 2 is a front view of the recording means of FIG. 1.

FIG. 5 is a plot of intensity vs. distance through a focused spot formed from a holographic lens with wavelength matching according to the present invention.

DETAILED DESCRIPTION

Figure 3:
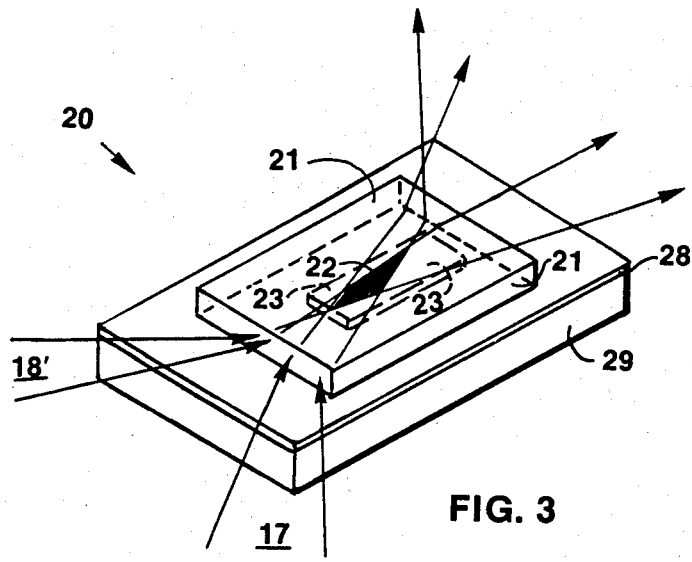
FIG. 3 is a perspective view of the recording means of FIG. 1.

A typical apparatus 10 (FIG. 1) according to the present invention for recording holograms comprises means such as a laser 11 for generating a beam of coherent electromagnetic radiation of a first frequency and free-space wavelength 12, a beam splitter 13 for dividing the beam of coherent radiation 12 into two phase-related beams 14 and 18. One of these beams 14 is reflected by a mirror 15 through a focusing lens 16 toward a recording means 20. After passage through lens 16, this beam is termed information beam 17. The other beam 18 is reflected by a mirror 19 through focusing lens 16' toward recording means 20. After passage through lens 16', this beam is termed reference beam 18'. Because beams 17 and 18' are phase related, they interfere in transparent medium 21 of a first refractive index to form a stationary set of interference fringes 22. By placing a recording second medium 23 in contact with the transparent medium 21 such that the interference fringes 22 are continuous across the boundary between the transparent medium 21 and the recording means 23, the interference fringes 22 are transferred into the recording means 23 at a fringe spacing dependent on the refractive index of the transparent medium 21 to form a hologram 22.

Although the apparatus 10 and 20 depicted in FIGS. 1, 2 and 3 is typical of a setup used to produce a holographic lens 22 (FIG. 4), modifications of this apparatus can be used to produce other forms of holograms such as an object hologram. For example, to produce an object hologram, the lens 16 is replaced by an object for which an object hologram is desired. Also other beam geometries can be used for both the reference and information beams and will depend on the final use of the resulting hologram.

Figure 4:
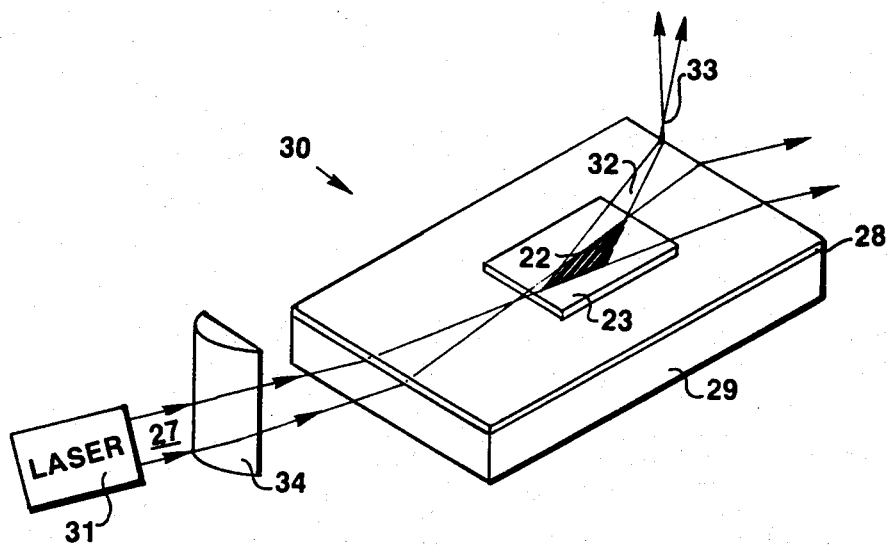
FIG. 4 is a perspective view of a typical configuration according to the present invention for reading a holographic lens.

As shown in FIG. 2, beams 17 and 18' are directed downward at a slight angle, $\alpha$, to insure that the interference pattern 22 exists at the boundary between the transparent medium 21 and the recording second medium 23. The angle $\alpha$ is made as small as possible, typically less than 1°, to avoid distortion in the resulting hologram 22 (FIG. 4). Also as shown in FIG. 2, an index-matching fluid 25 with a refractive index higher than that of medium 21 but lower than that of recording second medium 23 is used to insure transfer of the interference pattern 22 from the transparent medium 21 to the recording second medium 23. The type of index-matching fluid 25 will depend to a large extent on its compatibility with transparent medium 21 and the recording second medium 23. Typically the indexing-matching fluid 25 is used to achieve better optical contact between the two media 21 and 23 by filling the voids formed by irregularities on the contacting surfaces of media 21 and 23. Use of an index-matching fluid 25 may be obviated by the ability to achieve good optical contact between the transparent medium 21 and the recording medium 23 through the use of other techniques such as the vapor deposition of the recording medium 23 onto the transparent medium 21.

A typical apparatus 30 (FIG. 4) for reading holograms formed with apparatus 10 comprises a coherent light source such as a laser 31 for generating a beam of reconstructing electromagnetic radiation 27 of a second frequency and free-space wavelength different than that of the beam of electromagnetic radiation 12 used to record the hologram 22, a lens 34 for focusing the reconstructing light 27, a waveguide 28, a substrate 29 on which the waveguide 28 is formed and having a refractive index less than that of the waveguide 28, and the second medium 23 containing the recorded interference fringes (hologram 22) of a refractive index greater than that of the waveguide 28. As will be discussed later, the index of refraction of the waveguide 28 or of the second medium 23 must be of such a value so as to produce a wavelength of the reconstructing beam 27 that is equal to the second wavelength used to record the hologram 22.

As illustrated in FIG. 4, application of the reconstructing beam 27 in the same direction as that of the reference beam 18' will result in the reconstruction of a converging information beam 32. Application of the reconstructing beam 27 in the opposite direction will result in reconstruction of a diverging information beam (not illustrated).

The wavelength of the reconstructing beam 27 is determined by the index of refraction of the waveguide mode. For a second medium 23 that is too thin to support any guided modes above the bare waveguide 28, the refractive index $n_2$ will be smaller than the surface refractive index of the bare waveguide 28. In this case, the light energy propagates in both the waveguide 28 and in the second medium 23. For a second medium 23 that is thick enough to support at least one guided mode over the bare waveguide substrate, the effective refractive index is determined by the mode refractive index of the second medium 23. In this case, the light propagates only in the second medium 23 and is evanescent in the waveguide 28.

To effectively eliminate chromatic aberrations in holograms written at one free-space wavelength and read at another free-space wavelength, the two wavelengths are made equal by passing them through transparent materials of different refractive indices so as to produce a wavelength that is the same for the recording beams 17 and 18' and the reconstructing beam 27. This may be expressed as, $$\lambda_R/n_R = \lambda_W/n_W$$

where $\lambda_R$ is the reconstructing third free-space wavelength, $n_R$ is the refractive index experienced by the reconstructing beam 27, $\lambda_W$ is the recording first free-space wavelength, and $n_W$ is the refractive index experienced by the recording beams 17 and 18'.

For example, consider a second medium 23 comprising diarsenic trisulfide ($As_2S_3$) on a titanium indiffused lithium niobate ($Ti:LiNbO_3$) waveguide 28. The bulk refractive index of the lithium niobate (LiNbO₃) is about 2.20, while the index at the surface of the waveguide 32 is about 2.21. Hence, guided modes in the waveguide will have a refractive index of about 2.2. An As₂S₃ second medium 23 has a bulk index of about 2.45. If a writing beam 12 of free-space wavelength 0.488 micrometers and a reconstructing beam 27 of free-space wavelength 0.6328 micrometers are used, then for a thin second medium 23, the refractive index at the reconstructing free-space wavelength will be close to about 2.21 and the matching material 21 should have a refractive index of about 1.7. If on the other hand, the As₂S₃ second material 23 is thick enough to support one mode, then the effective refractive index for the reconstructing beam will be in the range of about 2.21 to about 2.45 with a typical value being about 2.28. If a value of 2.28 is used, then the index of the matching material 21 should be about 1.76. A thicker second medium 23 will require higher indices for the matching material 21. At the limiting value of 2.45 for the effective refractive index, the matching material 21 requires an index of about 1.89. Glasses covering the index range from 1.7 to 1.89 are readily available.

In the currently preferred embodiment of the invention, a recording material 23 is deposited directly onto the surface 32 of the waveguide 28 as illustrated in FIGS. 1, 2, and 3. A transparent medium (matching material) 21 is then placed on the recording layer 23 with an index-matching fluid 25 between the matching material 21 and the second medium 23, the interference pattern is recorded with a beam of electromagnetic radiation, and the recording material is then developed. A typical matching fluid 25 is methylene iodide, which may also contain an additional ingredient to adjust the refractive index to the specific value desired. The matching material 21 and the matching fluid 25 are removed and the hologram 22 (FIG. 4) read with another beam of electromagnetic radiation 27 as described above. As a matter of convenience in reduction to practice, an alternative procedure was used. The recording material 23 was deposited directly on the matching material 21 and the hologram 22 was recorded with a beam of electromagnetic radiation 12. The recording layer 23 was then etched to produce a surface relief of the interference pattern 22. The matching block 21 was then clamped tightly onto the surface 32 of the waveguide 28 so that the etched recording medium 23 was in close contact with the waveguide surface 32. Light of the reconstructing wavelength 27 was then coupled into the waveguide 28 to read out the hologram 22. This procedure allowed the testing of the technique without requiring excessive handling and processing of the waveguide 28 or the use of an index-matching fluid 25. In some situations, this alternative procedure may be desirable.

EXAMPLE

Powdered As₂S₃ (99.999% pure; from Cerac of Milwaukee, Wis.) was placed in a quartz crucible and evaporated at 750° onto a 2×8 mm mask on a glass block 21 of refractive index 1.7. A three minute evaporation produced a 0.3000 micrometers thick recording second medium 23 on the glass block 21. The glass block 21 and the recording second medium 23 were positioned in the experimental setup shown in FIGS. 1, 2 and 3 with the exception that an index-matching fluid 25 and a focusing lens 16' were not used. The recording second medium 23 was exposed for ten minutes to argon laser radiation 12 with a free-space wavelength of 0.488 micrometers and with 10 mW of power per beam and a beam size of 3 mm (diameter).

After exposure, the second medium 23 was etched in a 5% solution of Polychrome (from Polychrome Corp. of Yonkers, N.Y.) and water for 1.5 minutes, rinsed in filtered water for one minute, rinsed in methanol for one minute, and hot-air dried.

The second medium 23 was clamped to a Ti:LiNbO₃ waveguide 28 formed on a LiNbO₃ substrate 29. The hologram 22 was read by guiding helium-neon laser light 27 of free-space wavelength 0.6328 micrometers into the waveguide 28.

FIG. 5 is a plot of intensity vs. distance for a scan through a focused spot 33 (FIG. 4) formed by a holographic lens using the wavelength-matching technique and illustrating the lack of distortion from chromatic aberration usually encountered in holograms recorded using a laser at one free-space wavelength and read using a laser at another free-space wavelength.

APPLICATION

Aberration free holographic lenses have many industrial applications. For example, they may be used as position sensors in robotics, in videodisc read heads in information transfer devices, and in integrated-optic spectrum analysers.

While the forms of the invention herein disclosed constitute presently preferred embodiments, many others are possible. It is not intended herein to mention all of the possible equivalent forms or ramifications of the invention. It is to be understood that the terms used herein are merely descriptive rather than limiting, and that various changes may be made without departing from the spirit or scope of the invention.

We claim:

1. A method of forming and reading a hologram comprising:
   directing recording beams of coherent electromagnetic radiation at a recording first frequency (and corresponding first wavelength in free space) into a first medium, having a first index of refraction, and therethrough at a recording second wavelength, and onto a surface of said first medium positioned contiguous to a surface of a recording second medium, having a second index of refraction, to form an interference pattern in both of said media, the pattern being continuous across the boundary between the two media;
   developing the recording second medium to produce a hologram therein; and
   directing a reconstructing beam of coherent electromagnetic radiation at a reconstruction second frequency that is lower than the recording first frequency (and corresponding third wavelength in free space that is longer than the said first wavelength) into a third medium having a third index of refraction, that is higher than said first index of refraction, and therethrough onto a surface of said third medium positioned contiguous to a surface of the second medium at or parallel to the said boundary, and into said second medium to read the hologram at the said recording second wavelength.

2. The method as defined in claim 1 wherein said refractive index of said first medium is less than the refractive index of said recording second medium.

3. The method as defined in claim 1 wherein contact between the contiguous surfaces of said first medium and said recording second medium is enhanced by providing an index-matching material having a refractive index greater than that of said first medium and less than that of said recording second medium between the contiguous surfaces.

4. The method as defined in claim 1 wherein said recording beams are directed toward said contiguous surfaces of said first and second media at an angle such as to insure that said interference pattern is recorded in said recording second medium.

5. The method as defined in claim 4 wherein said angle between said beams and said contacting surfaces is less than about one degree.

6. The method as defined in claim 1 wherein said third medium comprises a waveguide, and the third refractive index is an effective refractive index of a waveguide mode.

7. The method as defined in claim 6 wherein said third refractive index of said waveguide mode is less than the second refractive index of said second medium.

8. The method as defined in claim 7 wherein said recording medium supports at least one guided mode of said reconstructing beam and said wavelength of said reconstructing beam therein is determined by the effective refractive index of a guided mode of said second medium.

9. The method as defined in claim 8 wherein the ratio of said first free-space wavelength of said recording beams to said first refractive index of said first medium is substantially equal to the ratio of said third free-space wavelength of said reconstructing beam to said effective refractive index in said second medium.

10. The method as defined in claim 9 wherein said second medium comprises $As_2S_3$.

11. The method as defined in claim 10 wherein said first free-space wavelength of said recording beams is about 0.48 micrometers, said first refractive index of said first medium is about 1.7 to 1.89, said third free-space wavelength of said reconstructing beam is about 0.6328 micrometers, and said effective refractive index of said second medium is about 2.2 to about 2.45.

12. The method as defined in claim 11 wherein said first medium comprises glass.

13. The method as defined in claim 6 wherein said medium is too thin to support any guided modes of said reconstructing beam and said wavelength of said reconstructing beam is determined by said third refractive index of said waveguide mode.

14. The method as defined in claim 13 wherein the ratio of said first free-space wavelength of said recording beam to said first refractive index of said first medium is substantially equal to the ratio of said third free-space wavelength of said reconstructing beam to said refractive index of said waveguide mode.

15. The method as defined in claim 14 wherein said waveguide comprises Ti:LiNbO$_3$.

16. The method as defined in claim 15 wherein said first free-space wavelength of said recording beams is about 0.488 micrometers, said first refractive index of said first medium is about 1.7, said third free-space wavelength of said reconstructing beam is about 0.6328 micrometers, and said refractive index of said waveguide mode is about 2.2.

17. The method as defined in claim 16 wherein said first medium comprises glass.

* * * * *